(12) United States Patent
Miyasaka

(10) Patent No.: US 6,416,902 B1
(45) Date of Patent: Jul. 9, 2002

(54) NON-AQUEOUS LITHIUM ION SECONDARY BATTERY

(75) Inventor: Tsutomu Miyasaka, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/065,614

(22) Filed: Apr. 24, 1998

(30) Foreign Application Priority Data

Apr. 24, 1997 (JP) .............................. 9-107142

(51) Int. Cl.⁷ .............................. H01M 4/52; H01M 4/48
(52) U.S. Cl. .................. 429/223; 429/231.1; 429/231.3
(58) Field of Search .............................. 429/218.1, 223, 429/231.1, 231.3, 217

(56) References Cited

U.S. PATENT DOCUMENTS

| | | | |
|---|---|---|---|
| 4,497,726 A | * | 2/1985 | Brule et al. .............. 252/182.1 |
| 5,609,975 A | * | 3/1997 | Hasegawa et al. .......... 429/217 |
| 5,618,640 A | * | 4/1997 | Idota et al. ................. 429/194 |
| 5,718,989 A | * | 2/1998 | Aoki et al. ................. 429/218 |
| 5,773,168 A | * | 6/1998 | Kubo et al. ................. 429/223 |
| 5,783,333 A | * | 7/1998 | Mayer ........................ 429/223 |

* cited by examiner

Primary Examiner—Carol Chaney
(74) Attorney, Agent, or Firm—Sughrue Mion, PLLC

(57) ABSTRACT

A non-aqueous lithium ion secondary battery is composed of a positive electrode layer, a negative electrode layer, and a non-aqueous electrolyte. The positive electrode layer contains positive electrode active material of the following formula:

$$Li_xNi_{1-y}Co_{y-z}M_zO_{2-a}X_b$$

wherein M is Mg, Ca, Ba, Ti, V, Cr, Mn, Fe, Co, Cu, Zn, Nb, Mo, Ag, Ta, W, B, Al, Ga, In, C, Si, Ge, Sn, or Pb; X is a halogen atom; $0.2 < x \leq 1.2$, $0 < y \leq 0.5$, $z < y$, $0 < z < 0.5$, $0 \leq a \leq 1.0$ and $0 \leq b \leq 2a$; and at least one of positive and negative electrode layers contains rubber binder.

8 Claims, 1 Drawing Sheet

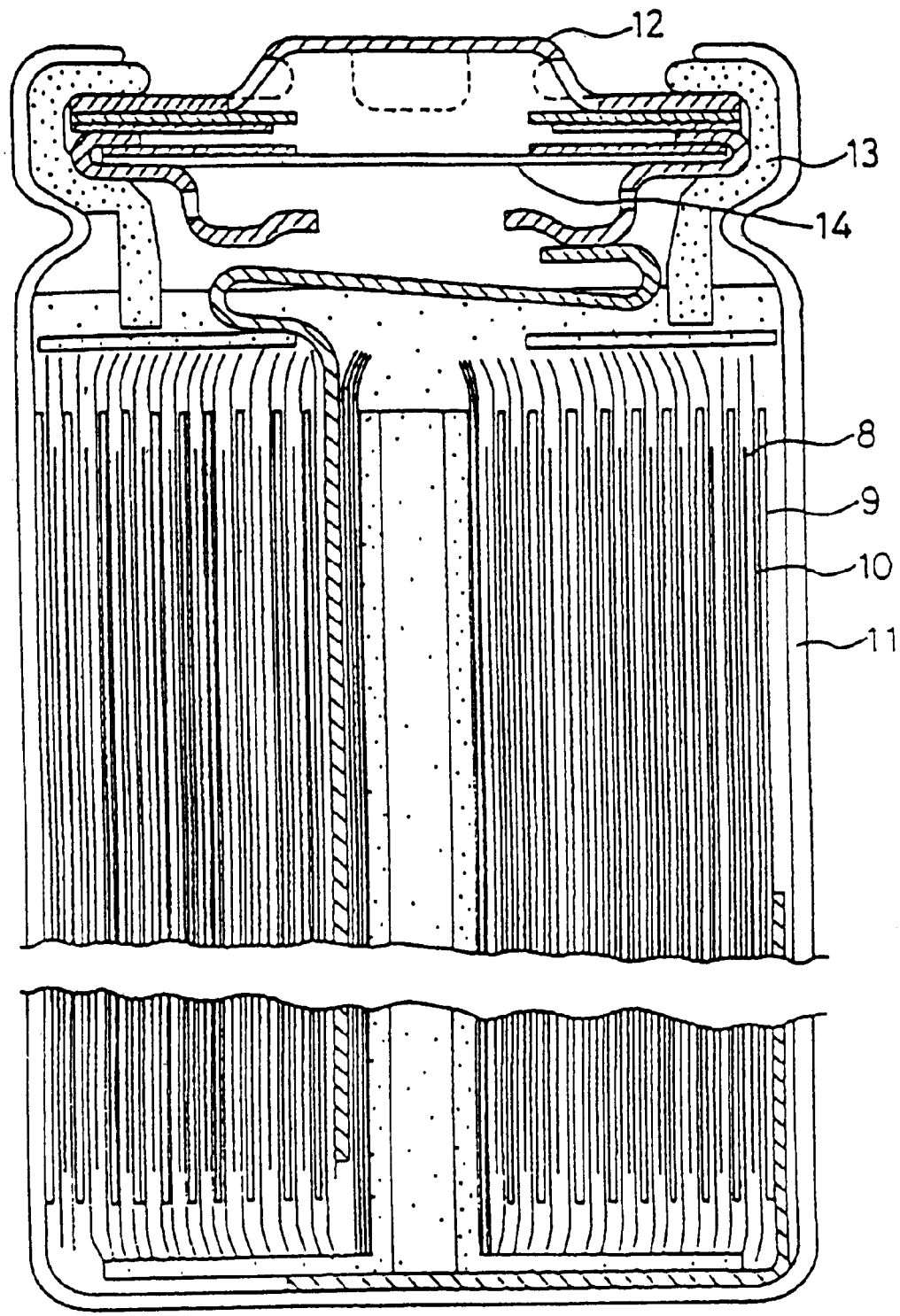
FIGURE

NON-AQUEOUS LITHIUM ION SECONDARY BATTERY

FIELD OF THE INVENTION

This invention relates to a non-aqueous lithium ion secondary battery having a high discharge capacity.

BACKGROUND OF THE INVENTION

As a non-aqueous lithium ion secondary battery for general use, a "rocking chair type" battery (which comprises a combination of lithium ion receiving/releasing materials) is widely employed in these days. The battery generally comprises a negative electrode of one or more of various carbonaceous materials (namely, negative electrode active material) into which lithium ions can be reversibly intercalated, and a positive electrode of lithium-containing metal complex oxide (namely, positive electrode active material) which can reversibly receive and release lithium ions.

As the positive electrode active materials, $LiCoO_2$, $LiCo_{1-x}Ni_xO_2$, $LiNiO_2$ and $LiMn_2O_4$ are generally employed. $LiCoO_2$ is advantageously used because it, in combination with Li, gives a high voltage of more than 3.5 volts, and a high discharge capacity (shown in Japanese Patent Provisional Publication No. 55-136131). Japanese Patent Provisional Publications H3-147276 and H4-123769 disclose a secondary battery comprising a positive electrode active material of $LiMn2O_4$. Since manganese is less expensive and more easily available than cobalt, the disclosed battery can be produced at a relatively low cost.

As the carbonaceous material for negative electrode active materials, graphite material, pitch coke, fibrous carbon, and soft carbon obtained by low temperature firing are known. However, since the carbonaceous material generally has a low bulk density of less than 2.20, the resultant battery shows a low discharge capacity even if the material is made to retain lithium ions at the stoichiometric maximum of intercalating capacity (372 mAh/g). In order to solve the problem, some publications propose negative electrode active materials of amorphous metal complex oxide mainly comprising tin oxide (Japanese Patent Provisional Publications No. H6-60867, No. H7-220721, No. H7-122274 and No. H7-288123, and PCT WO96-33519).

The above-mentioned amorphous metal complex oxide (negative electrode active material) in combination with cobalt oxide (positive electrode active material) gives a battery of a high energy density, but thus composed battery is considerably expensive. On the other hand, a battery comprising a negative electrode of the amorphous metal complex oxide and a positive electrode of manganese oxides has good cost performance, but its energy density is considerably small.

A battery comprising a positive electrode of nickel oxide has both good cost performance and a high discharge capacity. However, the battery employing $LiNiO_2$ (basic component of the positive electrode of nickel oxides) generally has such drawbacks that the average discharge voltage is lower than that of the battery using $LiCoO_2$ by 0.2 volt or more, and that its cycle capacity retention is relatively low. Because of the low discharge voltage, $LiNiO_2$ cannot effectively work in the low voltage range so that the capacity of the battery is restricted to an unsatisfactory level. Therefore, in order to improve the properties of positive electrode nickel oxide having $LiNiO_2$ skeleton, its components must be studied.

In a high capacity battery, the active materials of positive and negative electrodes generally have large Li-intercalating/releasing capacities per volume, and accordingly they have large volume expansion-shrinkage coefficients. Therefore, since the active materials likely vary their volume to a large extent, the battery is liable to exhibit unstable performance (e.g., deterioration of cycle capacity retention).

Accordingly, it is an object of the present invention to provide a non-aqueous lithium ion secondary battery having a high discharge capacity and exhibiting reliable performance.

SUMMARY OF THE INVENTION

The invention resides in a non-aqueous lithium ion secondary battery which comprises a positive electrode layer comprising an active material of lithium-containing metal complex oxide, a negative electrode layer comprising lithium ion retainable and releasable material, and a non-aqueous electrolyte, wherein the lithium-containing metal complex oxide is a nickel-containing lithium complex oxide of the following formula:

$$Li_xNi_{1-y}Co_{y-z}M_zO_{2-a}X_b$$

wherein M represents at least one element selected from the group consisting of the elements belonging to the groups 2 to 14 of the periodic table, particularly, Ca, Ba, Ti, V, Cr, Mn, Fe, Co, Cu, Zn, Nb, Mo, Ag, Ta, W, B, Al, Ga, In, C, Si, Ge, Sn and Pb; X is a halogen atom; x, y, z, a and b are numbers satisfying the conditions of $0.2 < x \leq 1.2$, $0 < y \leq 0.5$, $z < y$, $0 < z < 0.5$, $0 \leq a \leq 1.0$ and $0 \leq b \leq 2a$, respectively; and at least one of positive and negative electrode layers contains rubber binder.

BRIEF DESCRIPTION OF THE DRAWING

FIGURE is a schematic sectional view of a typical non-aqueous lithium ion secondary battery.

DETAILED DESCRIPTION OF THE INVENTION

Preferred embodiments of the invention are as follows:

(1) The positive electrode active material is a nickel-containing lithium complex oxide of the following formula:

$$Li_xNi_{1-y}Co_{y-z}M_zO_{2-a}X_b$$

wherein M represents at least one element selected from the group consisting of Mg, Ca, Ba, Ti, V, Cr, Mn, Fe, Co, Cu, Zn, Nb, Mo, Ag, Ta, W, B, Al, Ga, In, C, Si, Ge, Sn and Pb; X is a halogen atom; x, y, z, a and b are numbers satisfying the conditions of $0.2 < x \leq 1.2$, $0 < y \leq 0.5$, $z < y$, $0 < z < 0.5$, $0 \leq a \leq 1.0$ and $0 \leq b \leq 2a$, respectively;

(2) The positive electrode active material is a nickel-containing lithium complex oxide of the following formula:

$$Li_xNi_{1-y}Co_{y-z}M_zO_{2-a}X_b$$

wherein M represents at least one element selected from the group consisting of Mg, Ca, Ba, Ti, V, Cr, Mn, Fe, Co, Cu, Zn, Nb, Mo, Ag, Ta, W, B, Al, Ga, In, C, Si, Ge, Sn and Pb; X is a halogen atom; x, y, z, a and b are numbers satisfying the conditions of $0.2 < x \leq 1.2$, $0 < y \leq 0.5$, $z < y$, $0 < z < 0.5$, $0.01 \leq a \leq 0.5$ and $0.01 \leq b \leq 2a$, respectively.

(3) The lithium ion retainable and releasable material is amorphous metal complex oxide comprising a combination of a major amount of tin oxide as a main component and a minor amount of at least one element selected from the group consisting of transition metal elements, halogen, and the elements belonging to the groups 1, 2, 13, 14 and 15 of the periodic table, particularly, Li, Na, K, Cs, Rb, Ca, Ba, Mg, Al, Pb, Mn, Fe, B, Si, P, O, La, Y, Ge and F.

(4) The rubber binder comprises thermoplastic rubber.

(5) The rubber binder comprises thermoplastic fluororubber.

(6) The rubber binder is contained in an amount of 0.5 to 10 wt. % based on the total dry weight of the layer containing the active material.

(7) The rubber binder is contained in the amount of 1 to 5 wt. % based on the total dry weight of the layer containing the active material.

(8) The positive electrode layer contains the rubber binder.

(9) The negative electrode layer contains the rubber binder.

(10) The positive electrode active material is a nickel-containing lithium complex oxide of the following formula:

$$Li_xNi_{1-y}Co_{y-z}M_zO_{2-a}F_b$$

wherein M represents at least one element selected from the group consisting of the elements belonging to the groups 2 to 14 of the periodic table; x, y, z, a and b are numbers satisfying the conditions of $0.2<x\leq1.2$, $0<y\leq0.5$, $z<y$, $0<z<0.5$, $0.01\leq a\leq0.5$ and $0.01\leq b\leq2a$, respectively.

(11) The positive electrode active material is a nickel-containing lithium complex oxide of the following formula:

$$Li_xNi_{1-y}Co_{y-z}M_zO_{2-a}F_b$$

wherein M represents at least one element selected from the group consisting of Mn, Fe, Ti, B, Al Sn Si, Ga and M; x, y, z, a and b are numbers satisfying the conditions of $0.2<x\leq1.2$, $0<y\leq0.5$, $z<y$, $0<z<0.5$, $0\leq a\leq1.0$ and $0\leq b\leq2a$, respectively.

(12) The lithium ion retainable and releasable material is amorphous metal complex oxide obtained by intercalating lithium ions into an amorphous negative electrode active material precursor of the formula $Sn_xM^1_{1-x}M^2_yO_z$ wherein $M^1$ represents one or more elements selected from the group consisting of Mn, Fe, Pb and Ge; $M^2$ represents two or more elements selected from the group consisting of Al, B, P, Si, halogen, and the elements belonging to the groups 1, 2 and 3 of the periodic table; and x, y and z are numbers satisfying the conditions of $0<x\leq1.0$, $1\leq y\leq3$ and $1\leq z\leq8$, respectively.

(13) The non-aqueous electrolyte comprises ethylene carbonate and $LiPF_6$.

(14) The non-aqueous electrolyte comprises ethylene carbonate, diethyl carbonate and $LiPF_6$.

(15) The non-aqueous electrolyte comprises ethylene carbonate, dimethyl carbonate and $LiPF_6$.

The non-aqueous lithium ion secondary battery of the invention comprises a positive electrode active material, a negative electrode active material, and non-aqueous electrolyte containing lithium salt, and is characterized by having a high discharge capacity as compared with a conventional non-aqueous lithium ion secondary battery employing a simple carbonaceous negative electrode active material. The high capacity of the invention is given by the specific combination of the positive and negative electrode active materials.

The negative electrode active material can be prepared inside or outside of the battery cell. The inside preparation is performed by electrochemically intercalating lithium ions into a negative electrode active material precursor of metal complex oxide inside of the battery cell.

As the positive electrode active material, lithium-nickel complex oxide is employed. The lithium-nickel complex oxide used for the invention can be prepared, outside of the battery cell, by doping dopant elements into the basic substance ($LiNiO_2$ having layer structure), to form a solid solution of lithium-containing nickel complex metal oxide.

At least one of the positive and negative electrode active materials is mixed with at least one rubber binder to prepare electrode layer in the battery cell of the invention. In the layer, the active material particles are well bound to each other with the rubber binder.

With respect to the lithium-nickel complex oxide employed as the positive electrode active material, a detailed description is given below.

The positive electrode active material used for the present invention is a nickel-containing lithium complex oxide having the following formula:

$$Li_xNi_{1-y}Co_{y-z}M_zO_{2-a}X_b$$

In the formula, "M" represents at least one metal or semimetal element which partially substitutes for Li and/or Ni of $LiNiO_2$. "M" is one or more elements selected from the group consisting of the elements belonging to the groups 2 to 14 of the periodic table. "X" is a halogen atom; and x, y, z, a and b are numbers satisfying the conditions of $0.2<x\leq1.2$, $0<y\leq0.5$, $z<y$, $0<z<0.5$, $0\leq a\leq1.0$ and $0\leq b\leq2a$, respectively. By introducing "M" into $LiNiO_2$, the charge-discharge characteristics such as an average discharge voltage and cycle capacity retention are remarkably improved.

In a preferred embodiment, the complex oxide has the formula:

$$Li_xNi_{1-y}Co_{y-z}M_zO_{2-a}X_b$$

wherein M represents at least one element selected from the group consisting of Mg, Ca, Ba, Ti, V, Cr, Mn, Fe, Co, Cu, Zn, Nb, Mo, Ag, Ta, W, B, Al, Ga, In, C, Si, Ge, Sn and Pb; X is a halogen atom; x, y, z, a and b are numbers satisfying the conditions of $0.2<x\leq1.2$, $0<y\leq0.5$, $z<y$, $0<z<0.5$, $0.01\leq a\leq0.5$ and $0.01\leq b\leq2a$, respectively.

In a further preferred embodiment, "X" is fluorine and the complex oxide has the formula:

$$Li_xNi_{1-y}Co_{y-z}M_zO_{2-a}F_b$$

wherein M represents at least one element selected from the group consisting of Mg, Ca, Ba, Ti, V, Cr, Mn, Fe, Co, Cu, Zn, Nb, Mo, Ag, Ta, W, B, Al, Ga, In, C, Si, Ge, Sn and Pb; x, y, z, a and b are numbers satisfying the conditions of $0.2<x\leq1.2$, $0<y\leq0.5$, $z<y$, $0<z<0.5$, $0.01\leq a\leq0.5$ and $0.01\leq b\leq2a$, respectively.

Preferably, "M" represents one or more elements selected from the group consisting of Mn, Fe, Ti, B, Al, Sn, Si, Ga and Mg; and z is a number satisfying the condition of $0.01 \leq z \leq 0.5$. Further preferably, "M" represents one or more elements selected from the group consisting of Co, Mn, B, Al and Si; and z is a number satisfying the condition of $0.01 \leq z \leq 0.3$.

The lithium-nickel complex oxide of the invention can be obtained by the steps of: mixing a lithium compound (lithium source), a nickel compound (nickel source), a cobalt compound (cobalt source) and a metal compound containing "M" such as Mn, B, Al, Sn, Si, Mg, Fe and Ti ("M" source); and then firing the mixture at high temperatures or causing a reaction in the mixed compounds in accordance with sol-gel method.

Examples of the lithium compounds (i.e., lithium sources) include LiOH, $Li_2CO_3$, $Li_2O$, $LiNO_3$, $Li_2SO_4$, $LiHCO_3$, $Li(CH_3COO)$, and alkyl lithium. Examples of the nickel compounds (nickel sources) include NiO, $NiCO_3$, $Ni(NO_3)_2$, Ni powder, $NiCl_2$, $NiSO_4$, $Ni_3(PO_4)_2$, $Ni(CH_3COO)_2$, $Ni(OH)_2$, NiOOH and Ni alkoxide. Examples of the cobalt compounds (cobalt sources) include $Co_2O_3$, $Co_3O_4$, $CoCO_3$, $Co(NO_3)_2$ and $CoCl_2$. Examples of the compounds containing "M" ("M" sources) include $MnCO_3$, $MnO_2$, $Mn(NO)_3$, $B_2O_3$, $B(OH)_3$, $Al_2O_3$, $Al(NO_3)_3$, $Al(OH)_3$, $SnO_2$, SnO, $SnCl_2$, Sn alkoxide, $SiO_2$, SiO, alkoxy silane, $Mg(OH)_2$, $MgCO_3$, $MgCl_2$, $Fe_2O_3$, $FeCl_3$, FeOOH, $Fe(NO_3)_3$, $TiO_2$, $GeO_2$, $ZrO_2$, $Nd_2O_3$, $La_2O_3$, BaO, $SrCO_3$, $Zn(NO_3)_2$, $WO_3$, $Ga(NO_3)_2$, CuO, $V_2O_5$, $Sm_2O_3$, $Y_2O_3$, $AlF_3$, $BaF_2$, LiF, $LaF_3$, $SnF_2$, $Li_3PO_4$, $AlPO_4$ and $Ca(OH)_2$. The above-mentioned sources can be mixed in the form of a dry powder, otherwise they can be dissolved or dispersed in an appropriate solvent and dried to prepare a dry mixture or a slurry mixture.

In the case that the complex oxide is prepared by firing, the mixture is fired in the presence of oxygen at a temperature of 400 to 1,000° C., preferably 600 to 900° C., for 4 to 48 hours. The partial pressure of oxygen is preferably controlled at not less than 0.2 atm., more preferably not less than 0.5 atm. The firing process can be carried out twice or more. Prior to the firing, the mixture can be molded into pellets. The firing process can be carried out, for example, in accordance with the following methods: powder mixing method, solution mixing method, co-precipitation method, rapid quenching method, pellets firing metho, melt firing method using LiOH hydrate, method of firing under a restricted partial pressure of oxygen, fluorine doping method, and method for preparing an active material in which the composition of the surface is different from that of the inside.

The mean grain size of the positive electrode active material preferably is in the range of 1 to 30 μm, more preferably 3 to 15 μm (in terms of secondary particle size), or 0.1 to 1 μm, more preferably 0.1 to 0.5 μm (in terms of primary particle size). The term "secondary particle" here means a particle consisting of aggregated primary particles, and the mean grain size usually determined by grain size distribution measurement, for example by means of laser scattering. The secondary particle preferably has a spherical shape and a porous surface.

The specific surface area of the active material determined by BET method preferably is in the range of 0.1 to 10 $m^2/g$, more preferably 0.3 to 3 $m^2/g$. The tap density preferably is in the range of 2.3 to 2.9 $g/m^2$, more preferably 2.5 to 2.8 $g/m^2$.

The positive electrode active material of the invention may be crystalline or partially amorphous, but crystalline particles are preferred. In the case that the particles are crystalline, the lattice constants preferably are in the ranges of 2.81 to 2.91 (a-axis) and 13.7 to 14.4 (c-axis). The ratio of the diffraction intensity assigned to (104) face, based on that assigned to (003) face, preferably is in the range of 0.1 to 0.9, more preferably 0.3 to 0.8. Preferably, the diffraction lines corresponding to the starting materials (such as lithium carbonate and nickel oxide) and impurities produced by side reaction are not observed.

Preferred examples of the positive electrode active materials according to the invention are concretely shown below:

| | |
|---|---|
| $LiNi_{0.7}Co_{0.26}B_{0.04}O_2$ | $Li_{1.03}Ni_{0.67}Co_{0.26}B_{0.04}O_2$ |
| $Li_{1.03}Ni_{0.77}Co_{0.15}B_{0.03}Al_{0.20}O_{0.9}F_{0.1}$ | $LiNi_{0.7}Co_{0.26}B_{0.04}O_{1.9}F_{0.2}$ |
| $LiNi_{0.7}Co_{0.26}Al_{0.04}O_2$ | $LiNi_{0.7}Co_{0.26}Al_{0.04}O_{1.9}F_{0.2}$ |
| $Li_{1.03}Ni_{0.67}Co_{0.26}Al_{0.04}O_{1.9}F_{0.2}$ | $LiNi_{0.7}Co_{0.28}Mg_{0.02}O_2$ |
| $LiNi_{0.7}Co_{0.25}Ga_{0.05}O_2$ | $LiNi_{0.80}Co_{0.10}Mn_{0.10}O_2$ |
| $LiNi_{0.80}Co_{0.10}Mn_{0.07}B_{0.03}O_2$ | $LiNi_{0.80}Co_{0.10}Mn_{0.07}B_{0.03}O_{0.95}F_{0.05}$ |
| $Li_{1.03}Ni_{0.67}Co_{0.10}Mn_{0.07}B_{0.03}O_{0.95}F_{0.05}$ | $LiNi_{0.75}Co_{0.15}Cu_{0.1}O_2$ |
| $LiNi_{0.75}Co_{0.15}Zn_{0.1}O_2$ | $LiNi_{0.7}Co_{0.20}Fe_{0.10}O_2$ |
| $LiNi_{0.7}Co_{0.25}Ti_{0.05}O_2$ | $LiNi_{0.75}Co_{0.17}Sn_{0.08}O_2$ |
| $LiNi_{0.75}Co_{0.22}Si_{0.03}O_2$ | $LiNi_{0.7}Co_{0.25}Zr_{0.05}O_2$ |
| $LiNi_{0.7}Co_{0.25}P_{0.05}O_2$ | $LiNi_{0.7}Co_{0.25}Ge_{0.05}O_2$ |
| $LiNi_{0.7}Co_{0.27}Sm_{0.30}O_2$ | $LiNi_{0.80}Co_{0.15}B_{0.03}Al_{0.02}O_2$ |

The negative electrode of the battery according to the present invention comprises lithium ion retainable and releasable material. A typical example of the above material is carbonaceous material which can retain and release lithium ions. The carbonaceous material substantially consists of carbon, and examples of the material include: petroleum pitch, natural graphite, artificial graphite, non-graphite carbon, mesocarbon microbeads, PAN carbon fiber, cellulosic carbon fiber, pitch carbon fiber, vapor grown carbon fiber, dehydrated PVA carbon fiber, lignin carbon fiber, glass carbon fiber, and active carbon fiber.

Some compounds of metal or semimetal oxides or chalcogen are also employable as the negative electrode material. Particularly, complex oxides having amorphous structure are preferred. Since the negative electrode of amorphous complex oxide has a high capacity for retaining lithium ions, it gives the desired rocking chair type secondary battery having a high capacity in combination with the aforementioned lithium-nickel complex oxide positive electrode of high capacity.

The negative electrode active material preferably contains tin oxide as a main component and, as a minor component, one or more elements selected from the group consisting of transition metal elements, halogen, and the elements belonging to the groups 1, 2, 13, 14 and 15 of the periodic table. The material can be prepared by electrochemically intercalating lithium ions into an amorphous negative electrode active material precursor of metal complex oxide having the following formula:

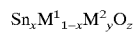

$$Sn_x M^1_{1-x} M^2_y O_z$$

In the above formula, "$M^1$" represents one or more elements selected from the group consisting of Mn, Fe, Pb and Ge; "$M^2$" represents two or more elements selected from the group consisting of Al, B, P, Si, halogen, and the elements belonging to the groups 1, 2 and 3 of the periodic table; and "x", "y" and "z" are numbers satisfying the conditions of $0 < x \leq 1.0$, $1 \leq y \leq 3$ and $1 \leq z \leq 8$, respectively. Preferably, "$M^1$" represents one or more elements selected from the group consisting of Pb and Ge; and "$M^2$" represents two or more elements selected from the group consisting of B, P, Si, and the elements belonging to the groups 1 and 3 of the periodic table. "$M^2$" preferably is other than Al.

The lithium ions are intercalated into the above precursor by electrically charging the battery precursor comprising the positive electrode active material, the negative electrode active material precursor, and a non-aqueous electrolyte containing lithium ions.

The above metal complex oxide (precursor) for the preparation of the negative electrode active material is characterized by being amorphous material. The term "amorphous material" in the invention means a material which gives a broad scattered band having its main peak in the range of 20° to 40° (in terms of 2θ) in X-ray diffraction using Cu—K α rays. In the scattered band, a diffraction line may be present. The diffraction line in the range of 40° to 70° (in terms of 2θ) preferably has an intensity as much as 500 times or less (more preferably as much as 100 times or less, and moreover as much as 5 times or less) than the diffraction line in the range of 20° to 40° (in terms of 2θ). Most preferably, there are present no diffraction lines representing a crystalline structure.

The negative electrode active material precursor can be prepared by the steps of: mixing a tin compound (Sn source) and compounds containing other elements; and then melting to cause a reaction of the mixture at 800 to 1,500° C. (preferably 900 to 1,200° C.) for 4 to 48 hours. The reaction is carried out under an atmosphere of inert gas such as nitrogen and argon. In the atmosphere, the partial pressure of oxygen is preferably controlled at not more than $10^{-1}$ atm., more preferably not more than $10^{-2}$ atm. The obtained product may be rapidly cooled at a rate of 50 to 500° C./minute so as to promote formation of amorphous structure. Otherwise, it may be slowly cooled to enhance the density of amorphous structure. Thus prepared glassy material is then pulverized to give grains having a mean grain size of 0.5 to 20 $\mu$m, preferably 1 to 10 $\mu$m.

The negative electrode active material precursor can be also prepared by solution reaction according to, for example, sol-gel method. The mean grain size of thus prepared material particle preferably is in the range of 0.1 to 10 $\mu$m, more preferably 0.2 to 5 $\mu$m (in terms of secondary particle size).

Preferred examples of the negative electrode active material precursors employable for the invention are concretely shown below:

$SnSi_{0.08}P_{0.2}O_{3.1}$  $SnSi_{0.5}B_{0.2}P_{0.2}O_{1.85}$
$SnSi_{0.8}B_{0.2}O_{2.9}$  $SnSi_{0.8}Al_{0.2}O_{2.9}$
$SnSi_{0.6}Al_{0.1}B_{0.2}O_{1.65}$  $SnSi_{0.3}Al_{0.1}P_{0.6}O_{2.25}$
$SnSi_{0.4}B_{0.2}P_{0.4}O_{2.1}$  $SnSi_{0.6}Al_{0.1}B_{0.5}O_{2.1}$
$SnB_{0.5}P_{0.5}O_3$  $SnK_{0.2}PO_{3.6}$
$SnRb_{0.2}P_{0.8}O_{3.2}$  $SnBa_{0.1}P_{1.45}O_{4.5}$
$SnLa_{0.1}P_{0.9}O_{3.4}$  $SnNa_{0.1}B_{0.45}O_{1.75}$
$SnLi_{0.2}B_{0.5}P_{0.5}O_{3.1}$  $SnCs_{0.1}B_{0.4}P_{0.4}O_{2.65}$
$SnBa_{0.1}B_{0.4}P_{0.4}O_{2.7}$  $SnCa_{0.1}Al_{0.15}B_{0.45}P_{0.55}O_{3.9}$
$SnY_{0.1}B_{0.6}P_{0.6}O_{3.55}$  $SnRb_{0.2}B_{0.3}P_{0.4}O_{2.55}$
$SnCs_{0.2}B_{0.3}P_{0.4}O_{2.55}$  $SnCs_{0.1}B_{0.4}P_{0.4}O_{2.65}$
$SnK_{0.1}Cs_{0.1}B_{0.4}P_{0.4}O_{2.7}$  $SnBa_{0.1}Cs_{0.1}B_{0.4}P_{0.4}O_{2.75}$
$SnMg_{0.1}K_{0.1}B_{0.4}P_{0.4}O_{2.75}$  $SnCa_{0.1}K_{0.1}B_{0.4}P_{0.5}O_3$
$SnBa_{0.1}K_{0.1}Al_{0.1}B_{0.3}P_{0.4}O_{2.75}$  $SnMg_{0.1}Cs_{0.1}Al_{0.1}B_{0.3}P_{0.4}O_{2.75}$
$SnCa_{0.1}K_{0.1}Al_{0.1}B_{0.3}P_{0.4}O_{2.75}$  $SnMg_{0.1}Rb_{0.1}Al_{0.1}B_{0.3}P_{0.4}O_{2.75}$
$SnCa_{0.1}B_{0.2}P_{0.2}F_{0.2}O_{2.6}$  $SnMg_{0.1}Cs_{0.1}B_{0.4}P_{0.4}F_{0.2}O_{3.3}$
$Sn_{0.5}Mn_{0.5}Mg_{0.1}B_{0.9}O_{2.45}$  $Sn_{0.5}Mn_{0.5}Ca_{0.1}P_{0.9}O_{3.35}$
$Sn_{0.5}Ge_{0.5}Mg_{0.1}P_{0.9}O_{3.35}$  $Sn_{0.5}Fe_{0.5}Ba_{0.1}P_{0.9}O_{3.35}$
$Sn_{0.8}Fe_{0.2}Ca_{0.1}P_{0.9}O_{3.35}$  $Sn_{0.3}Fe_{0.7}Ba_{0.1}P_{0.9}O_{3.35}$
$Sn_{0.9}Mn_{0.1}Mg_{0.1}P_{0.9}O_{3.35}$  $Sn_{0.2}Mn_{0.8}Mg_{0.1}P_{0.9}O_{3.35}$
$Sn_{0.7}Pb_{0.3}Ca_{0.1}P_{0.9}O_{3.35}$  $Sn_{0.2}Ge_{0.8}Ba_{0.1}P_{0.9}O_{3.35}$
$SnAl_{0.1}B_{0.5}P_{0.5}O_{3.05}$  $SnCs_{0.1}Al_{0.4}B_{0.5}P_{0.5}O_{3.65}$
$SnCs_{0.1}B_{0.5}P_{0.5}O_{3.05}$  $SnCs_{0.1}Ge_{0.05}B_{0.5}P_{0.5}O_{3.15}$
$SnCs_{0.1}Ge_{0.05}Al_{0.3}B_{0.5}P_{0.5}O_{3.60}$

The negative electrode active material can be prepared from the above precursors in combination with other materials such as lithium metal, lithium metal alloy, and carbonaceous material which can retain and release lithium metal or lithium ions. In order to intercalate lithium ions into the above precursor, a lithium ion source for intercalation can be placed in the battery precursor. The above material is used as the lithium ion source, which works by no means as the electrode active material.

In the battery of the present invention, at least one of positive and negative electrode layers contains rubber binder. With the rubber binder, the active material particles and electroconductive material are bound to be fixed in the matrix of active material mixture layer. The rubber binder is homogeneously mixed with the active material and the conductive material in dry or wet form, to prepare a coating dispersion of electrode active material mixture. The dispersion thus prepared is then coated on the electrode support (collector), and then dried to form an active material mixture layer.

The rubber binder employable for the invention is elastic polymer material, and examples of the binders include hydrocarbon polymer (described in U.S. Pat. No. 4,814,242) obtained by homopolymerization or copolymerization of a non-conjugated alkene monomer having double bond or a conjugated alkene monomer having two or more double bonds. Examples of the monomers include ethylene, propylene, iso-butylene, 1-pentene, methylstyrene, 4-phenylstylene, 1-hexane, vinylcyclohexane, 1,3-butadiene, 2-tert-butyl-1,3-butadiene, 1,3,5-hexatriene, 2-methyl-1,3-butadiene, 2,3-dimethyl-1,3-butadiene, 1,3-pentadiene, 1,5-cyclooctadiene and 5-ethylidenenorbornane. Preferred examples of the polymers (polyolefin rubbers) prepared from the above monomers include ethylene/propylene/isoprene copolymer, ethylene/propylene/butadiene copolymer, styrene/isoprene copolymer, styrene/butadiene copolymer, and ethylene/propylene copolymer. Polyethers such as polyethyleneoxide and polypropyleneoxide are also employable as the rubber binder. Further, aliphatic polyesters are also employable as the rubber binder. Examples of the aliphatic polyesters include poly(ethylene succinate), poly(ethylene adipate), poly(ethylene azelate), and poly(ethylene sebacate). Examples of particularly preferred rubber binders include poly(1,3-butadiene), ethylene-propylene-diene monomer copolymer (EPDM rubber) and butadiene-styrene copolymer.

among the above, thermoplastic rubbers (which can be molded at high temperature) are preferred. The thermoplastic fluororubber disclosed in Japanese Patent Provisional Publication H4-276090 is most preferred. Examples of the fluororubbers include thermoplastic polymer material comprising vinylidene fluoride/propylene hexafluoride copolymer and fluororesin such as teflon.

Fluororubber having electrochemically stable properties is also preferably used as the rubber binder for the invention. Examples of the fluororubbers include ethylene tetrafluoride/ethylene difluoride copolymer, ethylene tetrafluoride/propylene hexafluoride copolymer and poly(ethylene chloride trifluoride). Ethylene tetrafluoride/ethylene difluoride copolymer is particularly preferred.

Coating additives (such as CMC thickener) and polymer binder (such as teflon resin) are usually added to the rubber binder, and then the obtained mixture was coated on the electrode support in combination with the active material and electroconductive material to form an active material mixture layer. The rubber binder may be contained in the positive electrode mixture layer and/or negative electrode mixture layer. The amount of the rubber binder is preferably in the range of 1 to 10 wt. % (more preferably 1 to 5 wt. %)

based on the total dry weight of the mixture containing the active material, the electroconductive material and the binder.

The rubber binder may be used in combination with other binders. Examples of the binders employable with the rubber binder include starch, polyvinyl alcohol, carboxymethyl cellulose, hydroxypropyl cellulose, regenerated cellulose, diacetyl cellulose, polyvinyl chloride, poly(vinyl pyrrolidone), tetrafluoroethylene, polyfluorinated vinylidene (polyvinylidene fluoride), polyethylene, and polypropylene. These binders are preferably mixed with the rubber binder in an amount of less than 50 wt. % based on the weight of the rubber binder.

The electrodes are formed from electrode mixtures comprising the electrode active material. Each of the electrode mixtures for the positive electrode and the negative electrode may contain electroconductive material, binder, and filler, in addition to the electrode active material.

As the electroconductive materials, electro-conductive materials which are chemically stable in the battery are employed. Concrete examples of the materials include naturally produced graphite (e.g., flake graphite and massive graphite), synthetic graphite, carbon black, acetylene black, ketchen black, carbonaceous fibers, powder of metal (e.g., copper, nickel, aluminum, or silver), metal fibers, and polyphenylene derivatives. These materials can be employed singly or in combination. Particularly preferred is a combination of graphite and acetylene black. The amount of the electro-conductive material incorporated into the electrode material generally is not more than 50 wt. %, preferably 1 to 50 wt. %, more preferably 2 to 30 wt. %. When carbon or graphite is employed, its amount preferably is in the range of 2 to 15 wt. %.

The non-aqueous electrolyte employable for the battery of the invention comprises a non-protonic organic solvent and a lithium salt (namely, electrolyte) soluble in the solvent. Examples of the organic solvents include propylene carbonate, ethylene carbonate, butylene carbonate, dimethyl carbonate, diethyl carbonate, γ-butylol-actone, 1,2-dimethoxyethane, tetrahydrofurane, 2-methyl-tetrahydrofurane, dimethyl sulfoxide, 1,3-dioxolane, formamide, dimethyl formamide, dioxolane, acetonitrile, nitromethane, methyl formate, methyl acetate, phosphoric triester, trimethoxymethane, dioxolane derivatives, sulforane, 3-methyl-2-oxazolidione, propylene carbonate derivatives, tetrahydrofurane derivatives, diethyl ether, and 1,3-propane sultone. These solvents can be employed singly or in combination.

Examples of the lithium salts include $LiClO_4$, $LiBF_4$, $LiPF_6$, $LiCF_3SO_3$, $LiCF_3CO_2$, $LiAsF_6$, $LiSbF_6$, $LiB_{10}Cl_{10}$, lithium salts of lower aliphatic carboxylic acids, $LiAlCl_4$, LiCl, LiBr, LiI, chloroborane lithium, and lithium tetraphenyl borate. These lithium salts can be employed singly or combination.

Preferred is an electrolytic solution of $LiCF_3SO_3$, $LiClO_4$, $LiBF_6$ and/or $LiPF_6$ which is dissolved in a mixture of propylene carbonate or ethylene carbonate with 1,2-dimethoxyethane and/or diethyl carbonate. In the mixture, propylene carbonate or ethylene carbonate is mixed with 1,2-dimethoxyethane and/or diethyl carbonate preferably in the ratio of 0.4/0.6 to 0.6/0.4. 1,2-dimethoxyethane and diethyl carbonate are preferably mixed in a ratio in the range of 0.4/0.6 to 0.6/0.4. The concentration of the electrolyte preferably is in the range of 0.2 to 3 moles per one litter of the electrolytic solution.

In order to improve the cycle capacity retention of the secondary battery, it is particularly preferred for the electrolytic solution to comprise $LiPF_6$ (as lithium salt) dissolved in a solvent of ethylene carbonate or a mixed solvent of ethylene carbonate with diethyl carbonate or dimethyl carbonate.

The electrolytic solution can contain one or more organic solid electrolytes. Examples of the employable organic solid electrolytes include polyethylene oxide derivatives, polymers having polyethylene oxide unit, polypropylene oxide derivatives, polymers having polypropylene oxide unit, polymers having ion releasable group, a mixture of a polymer having ion releasable group and the aforementioned non-protonic electrolyte, and phosphoric ester polymers. The electrolytic solution may contain polyacrylonitrile. Also known is a combination of inorganic and organic solid electrolytes.

The separator is an electro-insulating thin film having a high ionic permeation rate and an appropriate physical strength. For instance, a film sheet or non-woven sheet made of an olefinic polymer such as polypropylene and polyethylene, or glass fiber can be employed. The pore size of the separator generally is in the range of 0.01 to 10 μm. The thickness of the separator generally is in the range of 5 to 300 μm.

If a solid electrolytic material such as polymer is employed as the electrolyte, the electrolyte can serve as the separator.

The electrolytic solution can further contain one or more materials described below, for improving charge-discharge characteristics: pyridine, triethyl phosphite, triethanolamine, cyclic ethers, ethylene diamine, n-glyme, triamide hexaphosphate, nitrobenzene derivatives, sulfur, quinoneimine dyes, N-substituted oxazolidinone, N,N'-substituted imidazolidinone, ethylene glycol dialkyl ether, quaternary ammonium salts, polyethylene glycol, pyrrole, 2-methoxyethanol, aluminum trichloride, monomers of electro-conductive polymer electrolyte active materials, triethylene phosphoneamide, trialkylphosphine, morpholine, aryl compounds having carbonyl group, hexamethylphosphoric triamide and 4-alkylmorpholine, bicyclic tertiary amines, oils, quaternary phosphonium salts, and tertiary sulfonium salts. A halogen-containing solvent such as carbon tetrachloride or trifluorinated chlorinated ethylene can be incorporated into the electrolytic solution so as to render the battery incombustible. Carbon dioxide gas may be incorporated into the electrolytic solution to improve the secondary battery in its resistance in high temperature storage.

Each of the positive electrode mixture and the negative electrode mixture may further contain supporting electrolyte such as ion-conductive polymer, nitromethane, electrolytic solution.

The surface of the positive electrode active material can be modified. For instance, the surface of the lithium-containing nickel metal complex oxide is treated with an esterifying agent or a chelating agent, or is coated with an electro-conductive polymer or polyethylene oxide. The surface of the negative electrode active material can be also modified, for instance, by coating its surface with an ion conductive polymer or a polyacetylene layer, or it may be treated with a lithium salt.

As the collector, any electroconductive materials which are chemically stable in the battery can be employed. Concrete examples of the materials for positive electrode collector include stainless steel, nickel, aluminum, titanium, fired carbon, and stainless steel or aluminum whose surface is treated with carbon, nickel, titanium or silver. Concrete examples of the materials for negative electrode collector include stainless steel, nickel, copper, aluminum, titanium, fired carbon, Al—Cd alloy, and stainless steel or aluminum whose surface is treated with carbon, nickel, titanium or silver. The surface of the above material may be oxidized. The collector can be produced in various forms such as foil, sheet, film, net, punched sheet, lath, porous body, foaming body and mold of fibers. The thickness of the collector is not particularly restricted, but generally in the range of 5 to 100 $\mu$m.

The non-aqueous lithium ion secondary battery of the invention can be produced in various forms such as coin form, button form, sheet, cylinder and square form. In the manufacture of the battery of coin form or button form, the electrode mixture comprising the active material and the above-mentioned materials is molded under pressure to give a pellet. On the other hand, in the manufacture of the battery of sheet, cylinder or square form, the electrode mixture is coated on the collector, and then dehydrated, dried, and pressed to give a sheet. The pressed dry sheet preferably has a thickness of 10 to 500 $\mu$m.

The lithium ion secondary battery (i.e., non-aqueous lithium ion secondary battery) of the invention can be utilized in various products and devices. Examples are handy personal computers (color or monochromatic), personal computers for imputing with pen, palm-top personal computers, notebook-type word processors, handy word processors, players for electronically playable book, handy phones, cordless phones (separated phones), pagers, handy terminals, handy facsimiles, handy duplicating machines, handy printers, head-phone stereos, video movies, liquid crystal television sets, handy cleaners, portable CD players, mini-disk players, electric shavers, electronic interpreters, phones for automobiles, transceivers, electrically actuator tools, electronic pocket notes, electronic calculators, memory cards, tape recorders, radio sets, and back-up electric sources. The secondary battery is also employable for motor cars, electric cars, motors, illuminating devices, toys, machines for amusement game, road conditioners, iron devices, watches, strobes, cameras, medical equipments (pace maker, hearing aids, massaging devices, etc.). The secondary battery is further employable in the field of space technology and military area. The secondary battery can be employed in combination with other electric sources such as solar battery.

The present invention is further described by the following non-restrictive examples.

EXAMPLE (I) Synthesis of Metal Complex Oxide (Negative Electrode Active Material Precursor) According to Melting Method SnO (67.4 g), $B_2O_3$ (17.4 g), and $Sn_2P_2O_7$ (102.8 g) were mixed and pulverized in an automatic mortar. The pulverized mixture was placed in an alumina crucible and fired at 1,000° C. for 10 hours under argon gas atmosphere. After the firing was complete, the mixture was cooled rapidly at the rate of 100° C./min., to give the negative electrode active material precursor of $SnB_{0.5}P_{0.5}O_3$ (compound A-1) as transparent yellowish glass. The X-ray diffraction measurement using Cu-$\alpha$ rays indicated a broad scattered band in the range of 20° to 35° (in terms of 2$\theta$), but no diffraction lines to be assigned to any crystal structures were observed, and thereby the obtained oxide was found to be amorphous.

The following negative electrode active material precursors were prepared in the same manner as described above.

$Sn_{1.5}K_{0.2}P_{3.5}$ (compound A-2)

$Sn_{1.0}Cs_{0.1}Ge_{0.05}Al_{0.1}B_{0.5}P_{0.5}O_{3.30}$ (compound A-3)

Each of the prepared compounds was found to have a mean grain size of 7 $\mu$m, and BET specific surface area was in the range of 0.7 to 1.2 m$^2$/g.

(II) Synthesis of Metal Complex Oxide (Negative Electrode Active Material Precursor) According to Sol-gel Method $Sn_{0.8}Si_{0.5}B_{0.3}P_{0.2}Al_{0.1}O_{3.70}$ (compound A-4) was prepared in the following manner.

212 g of diethoxy tin was dissolved in 100 g DMF, and then 34 g of phosphorus triethoxide, 51 g of triethoxyalminum, 36 g of triethoxyboron and 134 g of tetraethixysilane were added. After that, sulfuric acid was further added to prepare Liquid 1. Independently, 4.25 g of sorbitan monooleate was dissolved in 1,700 cc of toluene to prepare Liquid 2. Into thus prepared Liquid 2, Liquid 1 was dropwise added under stirring at 10,000 r.p.m. At the same time, 9 g of triethylamine was added five times (i.e., 9×5=45 g was added). The obtained solution was kept stirring at 40° C. for 2 hours, and then stored at 40° C. for 24 hours. After that, the solvent (toluene) was removed under reduced pressure. The residue was dried at 250° C. for 48 hours to obtain white powdery product (yield: 95%).

The particles of the prepared compound were porous sphere and have a mean grain size of 0.1 $\mu$m. BET specific surface area was 8 m$^2$/g.

(II) Preparation of Positive Electrode Active Material $LiNi_{0.8}Co_{0.16}B_{0.04}O_2$ (compound C-1) was prepared in the following manner.

Powders of $LiOH.H_2O$, $Ni(OH)_2$, $Co(OH)_2$ and $B_2O_3$ (molar ratio of 1:0.8:0.16:0.02) were place in a mortar, and well mixed under dry air atmosphere. The prepared mixture was fired in oxygen gas atmosphere at 650° C. for 6 hours, and then further fired at 750° C. for 8 hours. Thus, the desired oxide (compound C-1) was prepared. The prepared oxide was found to have a primary particle size of 0.3 $\mu$m (mean grain size) and a secondary particle size of 7 $\mu$m (mean grain size), and the shapes of the particle were almost sphere. BET specific surface area was 0.7 m$^2$/g. According to X-ray diffraction measurement, the ratio of the diffraction intensity assigned to (104) face based on that assigned to (003) face was 0.6, and the lattice constants were 2.83 (a-axis) and 13.90 (c-axis). One gram of the prepared oxide was dispersed in 100 mL of pure water and pH value of the dispersion was measured (pH 10.5).

The above procedures were repeated using independently $LiNO_3$ and $LiCO_3$ in place of $LiOH.H_2O$, and using $NiCO_3$ in place of $Ni(OH)_2$, to give the above-mentioned compound C-1.

The above procedures were repeated except using stoichiometric amount of $AL(OH)_3$ in place of $B_2O_3$, and firing the mixture in oxygen gas atmosphere at 650° C. for 6 hours, and then further firing at 800° C. for 12 hours, to prepare $LiNi_{0.08}Co_{0.16}Al_{0.04}O_2$ (compound C-2).

Further, the following compounds were prepared in the same manner as compound C-2.

$LiNi_{0.8}Co_{0.1}Mn_{0.1}O_2$ (compound C-3)

$LiNi_{0.8}Co_{0.1}Mn_{0.07}B_{0.03}O_2$ (compound C-4)

$LiNi_{0.8}Co_{0.15}Sn_{0.05}O_2$ (compound C-5)

$LiNi_{0.8}Co_{0.15}Si_{0.05}O_2$ (compound C-6)

$LiNi_{0.8}Co_{0.15}Mg_{0.05}O_2$ (compound C-7)

$LiNi_{0.8}Co_{0.15}Fe_{0.05}O_2$ (compound C-8)

$LiNi_{0.8}Co_{0.15}Ti_{0.05}O_2$ (compound C-9)

Furthermore, the following compounds were prepared in the above manner except for using LiF as fluorine source and firing the mixture at 650° C. for 24 hours under oxygen partial pressure of 0.5 atm.

$LiNi_{0.8}Co_{0.15}B_{0.05}O_{1.9}F_{0.1}$ (compound C-10)

$LiNi_{0.8}Co_{0.15}Al_{0.05}O_{1.9}F_{0.1}$ (compound C-11)

$LiNi_{0.8}Co_{0.2}O_2$ (comparison example 1) was also prepared by mixing $Li_2CO_3$, $NiCO_3$, $Co_3O_4$ and $Co_2O_3$ in the stoichiometric ratio, and firing the mixture in oxygen gas atmosphere at 650° C. for 4 hours, and then further firing at 800° C. for 8 hours.

(III) Preparation of Electrode Mixture Sheet (1) Positive Electrode Mixture Sheet The compound C-1 (90 wt. %), flake graphite (3 wt. %) and a binder (mixture of 2 wt. % of EPDM rubber emulsion, 1 wt. % of polytetrafluoroethylene emulsion and 1 wt. % of sodium polyacrylate) were kneaded after addition of water. The resulting slurry was coated on both sides of an aluminum film (thickness: 30 μm). The coated film was dried and pressed to give the desired positive electrode mixture sheet (amount of coated slurry: approximately 235 g/m$^2$, coat layer thickness: approximately 90 μm).

Independently, the above procedures were repeated except using polytetrafluoroethylene in place of EPDM rubber, to prepare a positive electrode mixture sheet for comparison.

(2) Negative Electrode Mixture Sheet

The compound A-1 (negative electrode active material precursor, 86 wt. %), flake graphite (3 wt. %), acetylene black (4 wt. %) and a binder (composition of 5 wt. % of styrene-butadiene rubber in water and 2 wt. % of carboxymethyl cellulose) were kneaded, after addition of water, by means of a homogenizer at 10,000 r.p.m. for more than 10 minutes. The resulting slurry was coated on both sides of a copper film (thickness: 18 μm). The coated film was dried and pressed to give the desired negative electrode mixture sheet (the amount of coated slurry: approximately 70 g/m$^2$, coat layer thickness: approximately 30 μm).

The surface of the resultant sheet was further coated with the mixture comprising flake graphite and aluminum oxide (mean grain size: 2 μm) in the ratio of 1:4 by weight. Thus, the negative electrode mixture sheet having a protective layer (average thickness: 5 μm) was prepared.

The above procedures were repeated except for using each of compounds A-2, A-3 and A-4 in place of compound A-1, to prepare negative electrode mixture sheets. Further, the procedures were repeated except for using polytetrafluoroethylene in place of styrene-butadiene rubber, to prepare a negative electrode mixture sheet for comparison.

(IV) Preparation of Secondary Battery of Cylinder Form

A sheet of lithium metal foil (thickness: 35 μm) was cut into strips (width: 5 mm, length: 37 mm). In dry air atmosphere (dew point: −60° C.), the strips were placed in parallel at 2 mm intervals on both sides of the above negative electrode mixture sheet, and then pressed to attach by means of a pressing roller. The amount of the attached lithium metal was approximately 110 mg. Thus equipped lithium metal strips supply lithium ions intercalated into the negative electrode active material precursor, to convert the precursor into the active material.

The positive electrode mixture sheet obtained above was cut to give a strip having a width of 35 mm, and the negative electrode mixture sheet having the lithium metal strips was cut to give a strip having a width of 37 mm. To the ends of respective sheets were spot-welded leading plates of aluminum and nickel, respectively, and dehydrated and dried at 150° C. for 2 hours in a dry atmospheric condition of a dew point of −40° C.

Both electrode sheets were installed in a nickel-plated iron cylinder battery container, in the manner as illustrated in the attached figure. The dehydrated dry positive electrode sheet 8, a separator of porous polypropylene film 10 (Cellgard 2400, available from Cellanese Corporation), the dehydrated dry negative electrode sheet 9, and another separator 10 were overlaid in this order, and then rolled by means of a mechanical winder. The obtained roll was put in the container 11 which also served as the negative electrode terminal. In the container, an electrolytic solution of 1 mole of LiPF$_6$ in one liter of a mixture of ethylene carbonate, butylene carbonate and dimethyl carbonate (2:2:6, volume ratio) was placed. The battery cap 12 was then fixed via a gasket 13. The positive electrode terminal 12 and the positive electrode mixture sheet 8, as well as the negative electrode mixture sheet 9 and the container 11, were connected to each other.

The resulting battery composition (which was a battery precursor) had a diameter of 14 mm and a height of 50 mm. The battery precursor was equipped with a safety valve 14.

Thus, a battery precursor using the compound C-1 as positive electrode active material was prepared.

The above procedures were repeated using a combination of the compounds C-2 to C-11 (positive electrode material) and the compounds A-1 to A-4 (negative electrode material), prepare various battery precursors.

Each of the above prepared battery precursors was allowed to stand for 12 hours at room temperature, and then was preliminarily charged at 0.1 A for 1 hour. The battery precursor was then aged at 50° C. for 10 days. After the aging, it was confirmed that the lithium metal strips attached on the negative electrode mixture sheet was dissolved to supply lithium ions and the ions were intercalated into the negative electrode precursor, and thereby the battery precursor was turned into the lithium ion secondary battery.

Each of the above prepared batteries was charged at 2 mA/cm$^2$ to 4.2 V at room temperature. Thus activated batteries were then aged at 55° C. for 3 days.

Each battery was then evaluated in its discharge capacity by repeated charge-discharge cycle under the conditions that the voltage at which the charge was terminated at 4.2 volts, the voltage at which the discharge was terminated at 2.8 volts, and electric currents for the charge-discharge were 2 mA/cm$^2$ (i.e., 0.2 C).

The cycle capacity retention of each battery was also evaluated in the following manner: the battery was subject to 100 times repeated charge-discharge cycles (electric current: 10 mA/cm$^2$ (i.e., 1.0 C)), and then the ratio of the discharge capacity (electric current: 0.2 C) based on the initial capacity was measured to evaluate the cycle capacity retention.

The results are set forth in Table 1.

TABLE 1

|  | Positive | Rubber binder | Negative | Initial capacity/Ah | Cycle capacity retention/% |
| --- | --- | --- | --- | --- | --- |
| C.E. 1 | Com-1 | — | A-1 | 0.95 | 83 |
| C.E. 2 | Com-1 | — | A-2 | 1.15 | 84 |
| C.E. 3 | Com-1 | — | A-3 | 1.00 | 88 |
| C.E. 4 | Com-1 | — | A-4 | 1.02 | 88 |
| C.E. 5 | C-1 | not used | A-1 | 1.11 | 84 |
| C.E. 6 | C-1 | not used | A-2 | 1.24 | 84 |
| C.E. 7 | C-1 | not used | A-3 | 1.13 | 89 |
| C.E. 8 | C-1 | not used | A-4 | 1.14 | 89 |
| Ex. 1 | C-1 | both* | A-1 | 1.12 | 91 |
| Ex. 2 | C-1 | both* | A-2 | 1.24 | 91 |
| Ex. 3 | C-1 | both* | A-3 | 1.15 | 96 |
| Ex. 4 | C-1 | both* | A-4 | 1.15 | 96 |
| Ex. 5 | C-2 | both* | A-3 | 1.14 | 95 |
| Ex. 6 | C-2 | both* | A-4 | 1.15 | 95 |
| Ex. 7 | C-3 | both* | A-3 | 1.16 | 94 |
| Ex. 8 | C-3 | both* | A-4 | 1.16 | 94 |
| Ex. 9 | C-4 | both* | A-3 | 1.14 | 92 |
| Ex. 10 | C-4 | both* | A-4 | 1.14 | 94 |
| Ex. 11 | C-5 | both* | A-4 | 1.13 | 95 |

TABLE 1-continued

|  | Positive | Rubber binder | Negative | Initial capacity/Ah | Cycle capacity retention/% |
|---|---|---|---|---|---|
| Ex. 12 | C-6 | both* | A-4 | 1.13 | 94 |
| Ex. 13 | C-7 | both* | A-3 | 1.14 | 93 |
| Ex. 14 | C-8 | both* | A-3 | 1.15 | 93 |
| Ex. 15 | C-9 | both* | A-3 | 1.13 | 95 |
| Ex. 16 | C-10 | both* | A-4 | 1.14 | 96 |
| Ex. 17 | C-11 | both* | A-4 | 1.14 | 96 |

Remark
*The "both" means that the rubber binder is used for preparing both electrodes.

The results shown in Table 1 indicate that the lithium ion secondary batteries of the invention are superior in the discharge capacity and cycle capacity retention to the referential battery.

What is claimed is:

1. A non-aqueous lithium ion secondary battery which comprises a positive electrode layer comprising an active material of lithium-containing metal complex oxide, a negative electrode layer comprising lithium ion retainable and releasable material, and a non-aqueous electrolyte;

wherein the lithium-containing metal complex oxide is a nickel-containing lithium complex oxide of the following formula:

$$Li_xNi_{1-y}Co_{y-z}M_zO_{2-a}X_b$$

wherein M represents at least one element selected from the group consisting of Mg, Ca, Ba, Ti, V, Cr, Fe, Cu, Zn, Nb, Mo, Ag, Ta, W, B, Ga, In, C, Si, Ge, Sn and Pb; X is a halogen atom; x, y, z, a and b are numbers satisfying the conditions of $0.2<x\leq1.2$, $0<y\leq0.5$, $z<y$, $0<z<0.5$, $0.01\leq a\leq0.5$, and $0.01\leq b\leq2a$, respectively; and at least one of the positive and negative electrode layers contains a rubber binder.

2. The non-aqueous lithium ion secondary battery of claim 1, wherein the lithium ion retainable and releasable material is amorphous metal complex oxide comprising a combination of a major amount of tin oxide as a main component and a minor amount of at least one element selected from the group consisting of Li, Na, K, Cs, Rb, Ca, Ba, Mg, Al, Pb, Mn, Fe, B, Si, P, O, La, Y, Ge and F.

3. The non-aqueous lithium ion secondary battery of claim 1, wherein the rubber binder comprises thermoplastic rubber.

4. The non-aqueous lithium ion secondary battery of claim 1, wherein the rubber binder comprises thermoplastic fluororubber.

5. The non-aqueous lithium ion secondary battery of claim 1, wherein the rubber binder is contained in an amount of 0.5 to 10 wt. %, based on the total dry weight of the layer.

6. The non-aqueous lithium ion secondary battery of claim 1, wherein the rubber binder is contained in an amount of 1 to 5 wt. %, based on the total dry weight of the layer.

7. The non-aqueous lithium ion secondary battery of claim 1, wherein the rubber binder is contained in the positive electrode layer.

8. The non-aqueous lithium ion secondary battery of claim 1, wherein the rubber binder is contained in the negative electrode layer.

* * * * *